United States Patent [19]

Niederer et al.

[11] 4,335,811

[45] Jun. 22, 1982

[54] EGG ARRANGING APPARATUS

[75] Inventors: Lee H. Niederer; Thomas O. Niederer, both of Titusville, N.J.

[73] Assignee: Otto Niederer Sons, Inc., Pennington, N.J.

[21] Appl. No.: 200,119

[22] Filed: Oct. 24, 1980

[51] Int. Cl.$^3$ ............................................. B65G 47/68
[52] U.S. Cl. .................................................. 198/446
[58] Field of Search .............................. 198/445–446

[56] References Cited

U.S. PATENT DOCUMENTS

| | | |
|---|---|---|
| 2,497,655 | 2/1950 | Bramson . |
| 2,646,870 | 7/1953 | Parry ..................................... 198/446 |
| 2,704,146 | 3/1955 | Reck . |
| 2,919,787 | 1/1960 | Reck et al. . |
| 3,139,176 | 6/1964 | Bliss . |
| 3,311,216 | 10/1965 | Jones . |
| 3,610,400 | 10/1971 | Burkholder . |
| 3,716,127 | 2/1973 | Loeffler . |
| 4,042,100 | 8/1977 | Morrone .......................... 198/446 |

Primary Examiner—Robert B. Reeves
Assistant Examiner—Paul A. Sobel
Attorney, Agent, or Firm—John J. Kane; Frederick A. Zoda; Albert Sperry

[57] ABSTRACT

An apparatus is disclosed for ordering randomly positioned eggs travelling upon a conveyor into rows. The positioning device includes a plurality of vertically disposed spring abutment members, disposed above the conveyor to contact the eggs as they pass by. The spring abutment members are pivotally mounted for oscillating rotation about an axis perpendicular to the direction of conveyance. The positioning device further includes moving vertical walls, comprising endless belts driven about vertically disposed rollers, whose movement will stop responsive to lateral pressure on the walls caused by egg jams.

16 Claims, 3 Drawing Figures

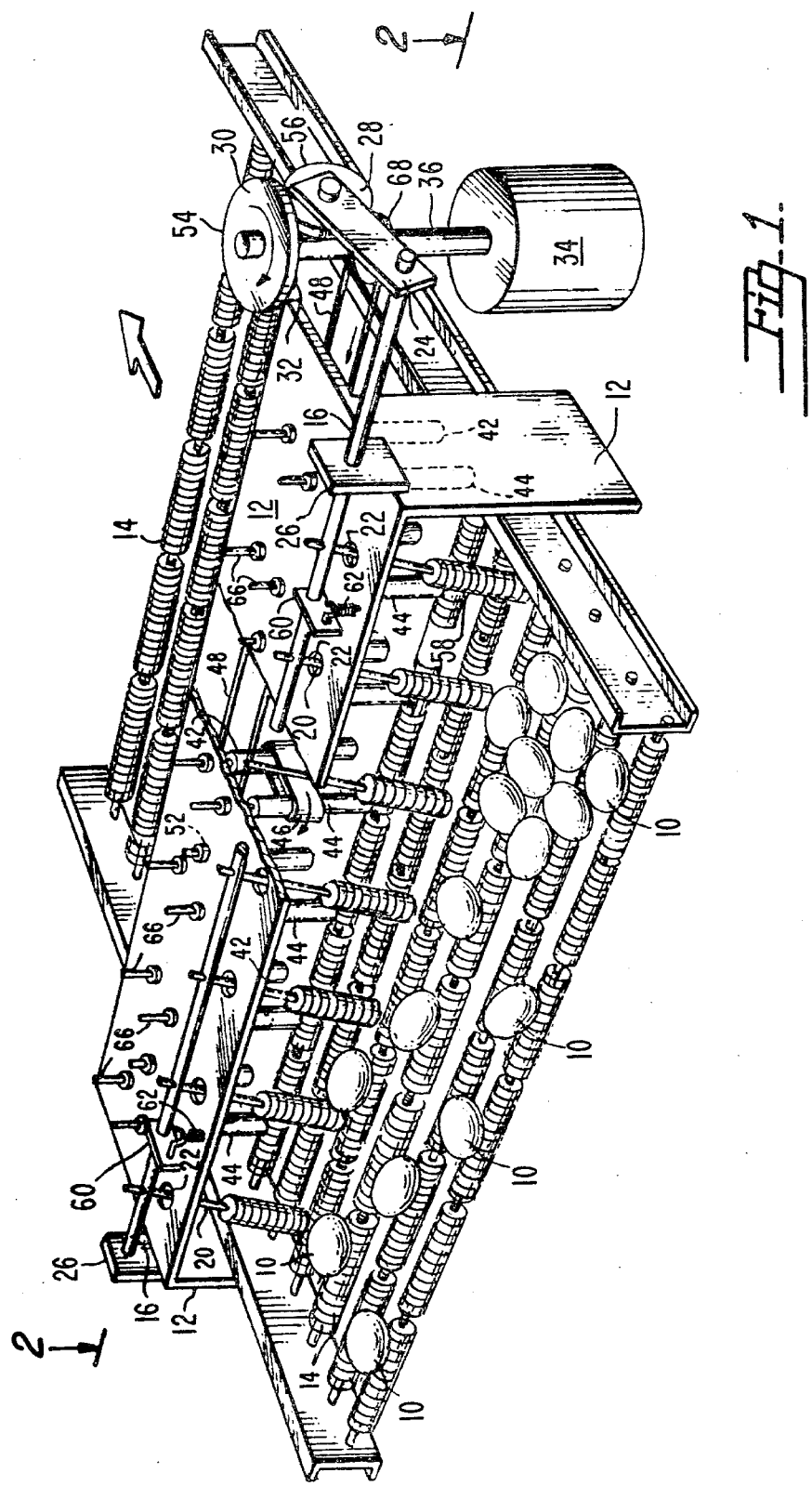

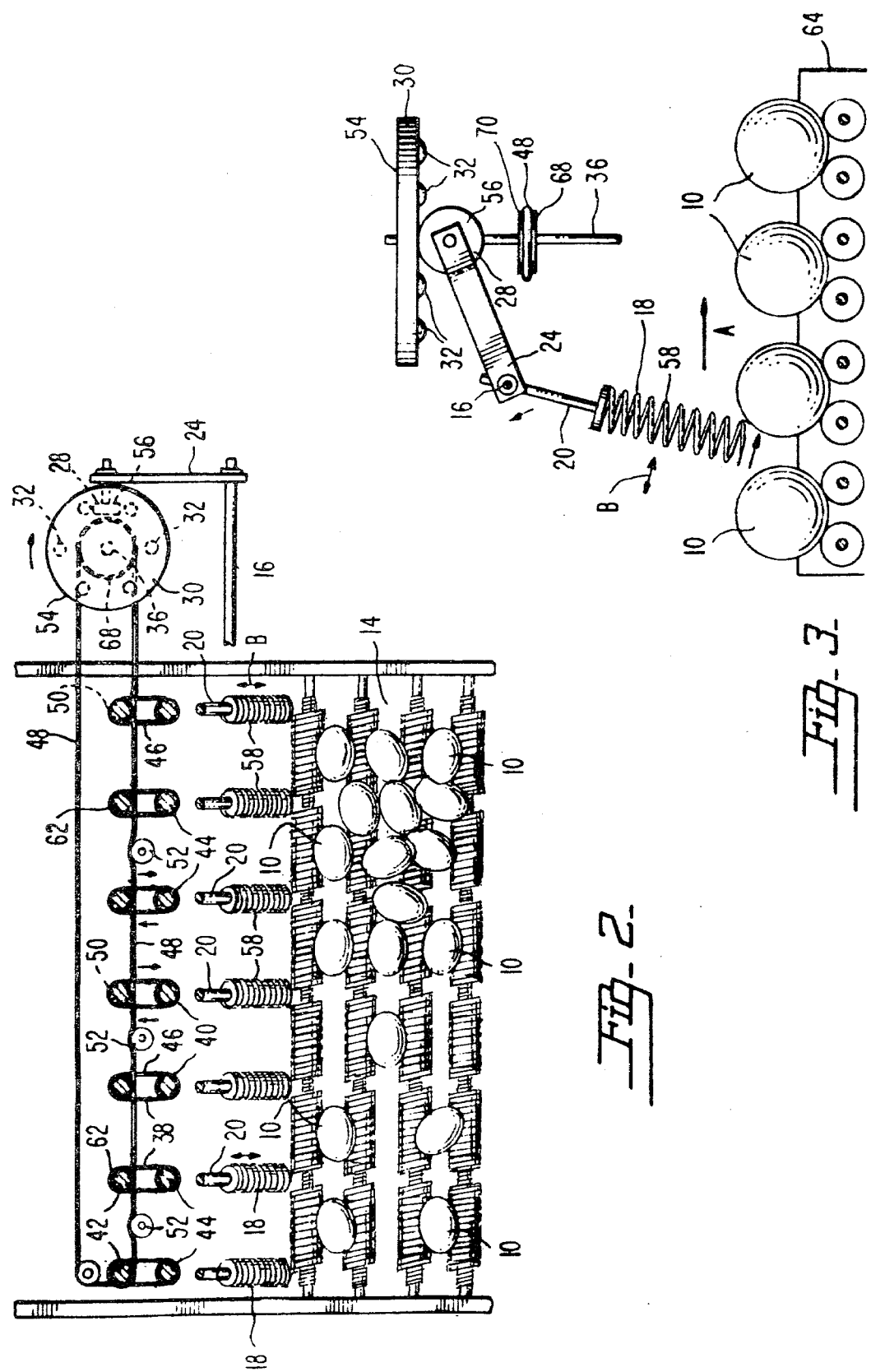

EGG ARRANGING APPARATUS

BACKGROUND OF THE INVENTION

1. Field of the Invention

The present invention deals with the field of egg processing equipment. Various types of means for processing eggs are normally positioned adjacent to a conveyor means thereon such that the conveyor takes the eggs through the individual stations for the individual processes. The present invention discloses a means for the arranging of such eggs from a random orientation upon the conveyor into an order of rows upon the conveyor. The present invention provides a novel means for accomplishing this purpose by separating the eggs by an abutment means which may be selectively declutching and passing the eggs by a plurality of dividers positioned thereafter having movable walls which are capable of halting movement responsive to an egg jam.

2. Description of the Prior Art

Prior art devices have patented on divider systems accomplishing a similar end to the present invention but with completely distinct means such as U.S. Pat. Nos. 3,139,176 and 3,716,127. These patents disclose means for providing dividers for ordering eggs into rows. These patents do not show the combination of an abutment member in association with declutching moving divider means as disclosed and claimed herein.

SUMMARY OF THE INVENTION

The present invention provides an egg arranging apparatus which is particularly usable for the ordering of eggs into rows as they are traveling in a random orientation upon an egg conveying device. This apparatus includes a housing means which is fixedly secured with respect to the environmental structure of the egg carrying device and which extends transversely across the conveyor. A transverse member is preferably pivotally secured with respect to the housing means and extends transversely across the conveyor also.

A plurality of abutment members which are preferably of a resilient cylinder-like spring configuration are fixedly secured with respect to the transverse member and extend downwardly therefrom through apertures defined in the housing. These abutment members are positioned such as to be adjacent to the upper surface of the egg conveying device and slightly spaced thereabove to be contacted by eggs being carried longitudinally along the egg conveying means. An arm means is preferably included to be fixedly secured with respect to this transverse member to be pivotally movable also with respect to the housing means. A cam follower member is secured to this arm means. A camming means is positioned selectively in engagement with the cam follower means to thereby control pivotal movement of the arm means and the transverse member as well as the abutment members. This camming means includes a plurality of cam lobes thereon for selective abutment with the cam follower. A drive means is preferably operably connected with respect to the camming means to cause movement thereof. The drive means also preferably includes a drive shaft extending downwardly therefrom.

A plurality of dividers is included which are secured with respect to the housing means and extend downwardly therefrom to a position immediately above the egg conveying means. These dividers preferably are aligned longitudinally along the egg conveying means with respect to the abutment members to be adapted to contact the eggs after they pass by the abutment members to thereby facilitate the guiding of the eggs into orderly rows upon the conveying means. These divider means preferably include continuously moving walls which are adapted to stop moving responsive to excessive lateral bias exerted by undesirable conditions such as an egg jam.

These moving walls are generally formed by configuring the divider members as a plurality of sets of roller members preferably with each set includes two roller members, namely, a first roller and a second roller member both being pivotally secured with respect to the housing means. A roller belt is preferably included extending about each set of first and second roller members to operably cause simultaneous rotation thereof. A drive belt is also included in abutting contact with the first roller member and is adapted to drive that roller member and thereby also consequently drive the second roller member. This drive belt is positioned preferably about a drive pulley which is fixedly secured to the drive shaft of the drive means such that as the drive means is actuated the drive pulley will be rotated and the drive belt will cause rotation of the first and second roller members. The abutment surface between the drive belt and each first roller should be a limited friction preferably to allow slippage therebetween responsive to a predetermined amount of lateral bias exerted on the roller belt by an egg jam between the dividers.

To control contact between the drive belt and the first roller means a drive groove may be defined within the first roller means circumferentially about the upper section thereof. Also to further facilitate this contact at least one tension pulley means may be rotatably secured to the housing means and positioned in engagement with the drive belt on the opposite side from the first roller means. In this manner tension will be accurately controlled between the drive groove and the drive belt.

It is an object of the present invention to provide an egg arranging apparatus usable for the ordering of eggs into rows from random position upon an egg conveying means which includes a plurality of abutment members which exert no bias or movement against the eggs until the eggs exert pressure thereon.

It is an object of the present invention to provide an egg arranging apparatus which includes movable separators as well as dividers having movable walls thereof which are both driven from a single drive means.

It is an object of the present invention to provide an egg arranging apparatus usable for the ordering into rows of eggs randomly positioned upon a conveyor which is easy to keep maintained and thereby minimize down time.

It is an object of the present invention to provide an egg arranging apparatus usable for the ordering into rows of eggs randomly positioned on an egg conveying means which includes a plurality of divider walls for separating the eggs which includes two roller members interconnected by a belt means.

It is an object of the present invention to provide an egg arranging apparatus usable for the ordering of eggs into rows from random positions upon an egg conveying means which minimizes egg breakage.

It is an object of the present invention to provide an egg arranging apparatus usable for the ordering of eggs into rows from random positions upon an egg conveying means which increases speed of operation and egg volume capability.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a perspective view of an embodiment of the egg arranging apparatus of the present invention;

FIG. 2 is a cross section view of the embodiment of FIG. 1 taken along lines 2/2; and FIG. 3 is a side plan view of the embodiment illustrated in FIG. 1.

DETAILED DESCRIPTION OF THE PREFERRED EMBODIMENT

The present invention provides an egg arranging apparatus which is particularly useful for receiving eggs 10 arranged randomly upon a conveyor means 14 therebelow and arranging these eggs in orderly rows.

The apparatus includes a housing means 12 which extends horizontally across the conveyor 14 and is fixedly secured with respect to the surrounding environmental structure. A transverse member 16 is pivotally secured with respect to the housing means 12 and extends transversely across the conveyor 14. A plurality of abutment members 18 are fixedly secured with respect to the transverse member and extend downwardly away from the housing means 12 toward the conveyor 14. The abutment members 18 themselves are actually mounted upon mounting pins 20 which are themselves fixedly secured to the transverse member 16. The mounting pins 20 extend through apertures 22 within the housing means 12. Abutment members 18 are extended downward to a position immediately above the upper surface of the conveying means 14 such as to be contacted by eggs 10 carried along the conveyor.

The transverse member 16 is pivotally secured with respect to the housing means 12 preferably by being placed within a plurality of mounting members 26. These mounting members maintain the transverse relationship of member 16. An arm means 24 is preferably fixedly secured with respect to the transverse members 16 in such a fashion as to extend outwardly therefrom. A cam follower member 28 is preferably secured to the arm means 24. The follower member 28 will preferably take the form of a wheel member 56 to facilitate rotation and following of a cam abutting thereagainst.

A drive means 34 is positioned adjacent to the housing 12 and includes a drive shaft 36 extending outwardly therefrom. A camming means 30 preferably in the form of a disc member 54 is fixedly secured with respect to drive shaft 36. The camming means 30 defines a plurality of cam lobes 32 thereon which are selectively in engageable contact with respect to the cam follower member 28.

The downwardly extending abutment members 18 provide an initial step of separation of the eggs 10 into rows. To complete this ordering of eggs 10 a plurality of divider members 38 are positioned in longitudinal alignment along the conveyor with respect to the abutment members 18. These divider members preferably include moving walls 40 to prevent unwanted jamming of the egg receiving channels and to facilitate the smooth flow of eggs in an orderly fashion thereby.

These moving walls are preferably formed by the actual configuration of the divider members 38. This particular form preferably is as roller members. Roller members 42 and 44 provide the divider member 38 with a moving wall 40. This is achieved by the placement of a roller belt 46 about each set of first and second roller members 42 and 44. In this manner as the first roller member 42 is driven the second roller member 44 will also rotate and the roller belt 46 extending therebetween will cause this rotation.

To cause driving of first roller members 42 a drive belt 48 is positioned adjacent thereto. To control abutting contact member between the drive belt 48 and the first roller members 42 a drive groove 50 may be defined in the outer surface of first roller members 42. Also to further facilitate this driving contact a drive pulley 52 as shown best in FIG. 2 may be rotatably mounted within the housing means 12 in such a fashion as to bias the drive belt 48 into the drive groove 50. A declutching powering means is provided to prevent egg jamming between divider members 38. The coefficient of friction between the drive belt 48 and the first rollers 42, or the drive grooves 50 defined therein, should be great enough to drive each set of first and second rollers 42 and 44 under normal operating conditions but low enough to allow slippage between grooves 50 and belt 48 when lateral pressure is exerted on belts 46 by egg jams. The coefficient of friction of the abutment surface 70 within grooves 50 can be controlled to monitor slippage.

Preferably the first and second roller members 42 and 44 will be pivotally mounted upon mounting stems 66 which themselves are fixedly secured with respect to the upper portion of the housing means 12. Also, preferably the drive shaft 36 will include a drive pulley 68 fixedly mounted thereon which is adapted to receive the drive belt 48 therein to facilitate rotational drive of the plurality of first roller means 42 and the resulting rotation of second roller means 44 and roller belt 46.

Preferably the abutment members 18 will take the form of spring members 58 which are resilient in such a fashion as to gently guide the eggs into approximate rows in a longitudinal direction to facilitate separation into correct alignment within rows between the divider members 38.

The camming means 30 and the cam follower member 28 may be chosen to be out of engagement when the transverse member 16 is in the steady state position without eggs exerting pressure thereon. With this configuration with eggs traveling down a conveyor as they contact the abutment members 18 a longitudinal pressure will be exerted which will cause the cam follower member 28 and the camming means 30 to come into contact with one another to thereby result in longitudinal movement of the abutment members as shown by arrow B. With this configuration the abutment members themselves will be disengageable or declutchable and will be actuated responsive to a pressure exerted by eggs traveling longitudinally on the conveyor means. Alternatively, the steady state position of the camming means 30 and the cam follower member 28 can be in engagement. This engagement can be maintained by a cam biasing means such as springs 62 which can be secured with respect to a spring arm 60 which is fixedly secured with respect to the transverse member 16. With the opposite end of the spring 62 secured to the housing means 12 a cam biasing means will be provided for maintaining contact between camming means 30 and cam follower member 28.

In operation the apparatus of the present invention preferably includes approximately seven abutment members 18 positioned at even locations transversely across an egg conveying means 14. The abutment members are positioned just above the moving conveyor and are adapted to contact the eggs. In one embodiment the steady state condition is shown in FIG. 3 of the plurality of abutment members 18 and arm means 24 and cam follower member 28. This entire combined configuration is rotatably movable about the axis of transverse member 16. In the steady state position shown in FIG. 3, the cam follower will not be in contact with the cam lobes 32. However, as the eggs 10 move in the conveying direction as shown by arrow A the eggs 10 will contact the rotatably cylindrical members 58. In this manner an angular force will be exerted tending to pivot this configuration about axis 16 in the clockwise direction as shown in FIG. 3. This slight movement resulting from the urging of eggs 10 will cause the lobes 32 to contact the cam follower member 28. In this manner the rotatably cylindrical members 58 will assume a continuous up and down motion in a rotatable direction as shown best by arrow B. This continuous motion will cause an initial amount of separating of the eggs 10 into orderly rows. The camming means 30 is urged to rotate by the actuation of drive means 34 and the resulting rotation of drive shaft 36.

In another configuration, the steady state condition of the camming means 30 and cam follower member 28 will always be in the engaged position as a result of utilizing a spring arm 60 fixedly secured with respect to transverse member 16 and the further inclusion of a resilient spring 62 secured with respect to the spring arm 60 at one end and with respect to the housing means 12 at the other end. With this configuration the spring 62 will provide a cam biasing means for maintaining continuous contact between the follower members 28 and the camming means 30. In this manner movement of the downwardly extending abutment members 18 will be continuous during operation of this apparatus in a direction as shown by arrow B.

The same drive used for camming movement can be used to cause rotational movement of a drive belt 48 as a result of rotation of drive pulley 68 which is mounted on drive shaft 36. This will operably drive the first roller member 48 in rotation resulting from biasing contact between the drive belt 48 and the drive grooves 50. This contact is further aided by the tension pulley means 52.

Rotation of each of the first roller members 42 will cause a rotational movement of each of the roller belts 46 with the resulting rotation of second roller members 44. In this manner a moving wall 40 will be provided adjacent to each side of the eggs which have been preliminarily divided by rows by the abutment members 18. This operation will be achieved since the abutment since the abutment members 18 are aligned longitudinally along the egg conveying means with respect to each set of roller members 42 and 44.

In this manner the present invention provides an overall configuration which includes a single drive for gently urging the eggs into rows initially by movement of rotatable cylindrical member 58 in an up and down direction as shown by arrow B in combination with the formation of divider means 38 having moving walls 40 to gently urge the eggs into rows. In this manner a single apparatus is provided for carefully and gently transferring eggs from random orientation upon the conveyor into rows.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. An egg arranging apparatus, usable for orienting eggs into rows from random positions upon an egg conveying device, which comprises:
   (a) a housing means fixedly secured with respect to the environmental structure of the egg conveying device, said housing means extending transversely across the egg conveying device at a location thereabove;
   (b) a transverse member being pivotally secured with respect to said housing means and extending transversely over the egg conveying device therebelow;
   (c) a plurality of abutment members being fixedly secured with respect to said transverse member and extending downwardly therefrom to be positioned adjacent to the upper surface of the egg conveying device and positioned spaced thereabove to abut eggs traveling longitudinally therealong;
   (d) an arm means fixedly secured with respect to said transverse member to be pivotally movable therewith with respect to said housing means;
   (e) a cam follower member secured with respect to said arm means;
   (f) a camming means being movable and positioned adjacent said cam follower member to be engaged thereby responsive to pivotal movement of said transverse member caused by said camming means including cam lobes thereon adapted to urge said cam follower member away therefrom causing pivotal movement of said transverse member and said abutment members into further abutment with the eggs located upon the egg conveyor means;
   (g) a drive means operably connected to said camming means to cause movement thereof, said drive means including a drive shaft extending outwardly therefrom;
   (h) a plurality of divider members secured with respect to said housing means and extending downwardly therefrom to a position immediately above the egg conveying means therebelow, said divider members being aligned longitudinally along the egg conveying means with respect to said abutment members to be adapted to contact the eggs after passage by said abutment members to thereby guide the eggs into orderly rows thereof upon the egg conveying means, said divider members including moving walls extending longitudinally therealong to minimize blockage of eggs traveling thereby;
   (i) a declutching powering means operably connected to said moving walls and responsive to a predetermined excessive bias being exerted laterally against said moving walls by eggs located between said divider members to disengage and stop movement of said moving walls as long as the condition exists.

2. The apparatus as defined in claim 1 wherein said divider members comprise:
   (a) a plurality of sets of roller members, each set including a first roller member and a second roller member each being rotatably secured with respect to said housing means;
   (b) a roller belt extending about each set of said first and second roller members to operably cause simultaneous rotation thereof;
   (c) a drive belt in abutting contact with each of said first roller members and adapted to cause rotation thereof when driven said first roller members each including an abutment surface thereon adapted to abut said drive belt with limited friction therebetween by allowing slippage between said drive belt and said first roller members responsive to a predetermined bias being exerted laterally upon said roller belts by eggs traveling between said divider members;
   (d) a drive pulley fixedly secured to said shaft of said drive means, said drive belt extending about said drive pulley to be driven thereby upon actuation of said drive means resulting in simultaneous driving of rotational movement of each set of said first and second roller members and of each roller belt extending therearound.

3. The apparatus as defined in claim 1 further comprising a cam biasing means to maintain continuous contact between said cam follower member and said camming means.

4. The apparatus as defined in claim 1 wherein said cam follower members and said camming means in the relaxed position are out of cantor with respect to one another and are adapted to engage responsive to bias exerted on said abutment members by eggs moving longitudinally along the conveyor.

5. The apparatus as defined in claim 1 wherein said camming means comprises a disc member with said cam lobes defined in the under surface thereof, said disc member being fixedly secured with respect to said drive shaft of said drive means.

6. The apparatus as defined in claim 1 wherein said cam follower comprises a wheel member selectively engageable with respect to said cam lobes of said camming means responsive to bias being exerted by the eggs traveling on the egg conveying means against said abutment members.

7. The apparatus as defined in claim 1 further including a plurality of mounting pins fixedly secured with respect to said transverse members and wherein said abutment members comprise resilient spring members to facilitate separation of eggs into rows upon abutment therewith.

8. The apparatus as defined in claim 7, wherein said housing means defined apertures therein through which said mounting pins extend to position said resilient spring members immediately above the egg conveyor means.

9. The apparatus as defined in claim 2 further including a plurality of mounting stems extending downwardly and fixedly secured with respect to said housing means, each of said roller members being rotatably mounted upon one of said mounting stems.

10. The apparatus as defined in claim 2, wherein each of said first roller members defines a drive groove therein extending horizontally therearound and being adapted to receive said drive belt therein to facilitate driving thereof, the interior surface of said drive groove defining said abutment surface.

11. The apparatus as defined in claim 2 further comprising at least one tension pulley means rotatably secured to said housing means and positioned in engagement with said drive belt on the opposite side from said first roller members to facilitate limited friction contact between said drive belt and said first roller members.

12. An egg arranging apparatus, usable for orienting eggs into rows from random positions upon an egg conveying device, which comprises:
   (a) a housing means fixedly secured with respect to the environmental structure of the egg conveying device, said housing means extending transversely across the egg conveying device at a location thereabove;
   (b) a transverse member being pivotally secured with respect to said housing means and extending transversely over the egg conveying device therebelow;
   (c) a plurality of abutment members being fixedly secured with respect to said transverse member and extending downwardly therefrom to be positioned adjacent to the upper surface of the egg conveying device and positioned spaced thereabove to abut eggs traveling longitudinally therealong;
   (d) an arm means fixedly secured with respect to said transverse member to be pivotally movable therewith with respect to said housing means;
   (e) a cam follower member secured with respect to said arm means;
   (f) a camming means being movable and positioned adjacent said cam follower member to be engaged thereby responsive to pivotal movement of said transverse member caused by said camming means including cam lobes thereon adapted to urge said cam follower member away therefrom causing pivotal movement of said transverse member and said abutment members into further abutment with the eggs located upon the egg conveyor means, said cam follower comprising a wheel member selectively engageable with respect to said cam lobes of said camming means responsive to bias being exerted by the eggs traveling on the egg conveying means against said abutment members;
   (g) a drive means operably connected to said camming means to cause movement thereof, said drive means including a drive shaft extending outwardly therefrom, said camming means comprising a disc member with said cam lobes defined in the under surface thereof, said disc member being fixedly secured with respect to said drive shaft of said drive means;
   (h) a plurality of divider members secured with respect to said housing means and extending downwardly therefrom to a position immediately above the egg conveying means therebelow, said divider members being aligned longitudinally along the egg conveying means with respect to said abutment members to be adapted to contact the eggs after passage by said abutment members to thereby guide the eggs into orderly rows thereof upon the egg conveying means, said divider members including moving walls extending longitudinally therealong to minimize blockage of eggs traveling thereby, said divider members further comprising:
      1. a plurality of sets of roller members each including a first roller member and a second roller member each being rotatably secured with respect to said housing means;
2. a roller belt extending about each set of first and second roller members to operably cause simultaneous rotation thereof;
3. a drive belt in abutting contact with each of said roller members and adapted to cause rotation thereof when driven, said first roller members each including an abutment surface thereon adapted to abut said drive belt with limited friction therebetween by allowing slippage between said drive belt and said first roller members responsive to a predetermined bias being exerted laterally upon said roller belts by eggs traveling between said divider members;
4. a drive pulley fixedly secured to said shaft of said drive means, said drive belt extending about said drive pulley to be driven thereby upon actuation of said drive means resulting in simultaneous driving of rotational movement of each set of said first and second roller members and of each roller belt extending therearound;
(i) a declutching powering means operably connected to said moving walls and responsive to a predetermined excessive bias being exerted laterally against said moving walls by eggs located between said divider members to disengage and stop movement of said moving walls as long as the condition exists;
(j) a cam biasing means to maintain continuous contact between sad cam follower member and said camming means;
(k) a plurality of mounting pins fixedly secured with respect to said transverse members and wherein said abutment members comprise resilient spring members to facilitate separation of eggs into rows upon abutment therewith, said housing means further defining apertures therein through which said mounting pins extend to position said resilient spring members immediately above the egg conveyor means; and
(l) at least one tension pulley means rotatably secured with respect to said housing means and positioned in engagement with said drive belt on the opposite side from said first roller members to facilitate limited friction contact between said drive belt and said first roller members.

13. An egg arranging apparatus, usable for the ordering into rows of eggs randomly positioned upon an egg conveying device, which comprises:
(a) a housing means fixedly secured with respect to the environmental structure of the egg conveying device, said housing means extending transversely across the egg conveying device at a location thereabove;
(b) a plurality of abutment members being pivotally secured with respect to said housing means and extending downwardly therefrom to be positioned adjacent to the upper surface of the egg conveying device and positioned spaced thereabove to be abutted by eggs traveling thereon;
(c) a drive means located adjacent said housing means, said drive means including a drive shaft extending outwardly therefrom; and
(d) a plurality of divider members secured with respect to said housing means and extending downwardly therefrom to a position immediately above the egg conveying means therebelow, said divider members being aligned longitudinally along the egg conveying means with respect to said abutment members to be adapted to contact the eggs after passage by said abutment members to thereby guide the eggs into orderly rows thereof upon the egg conveying means, said divider members comprising:
1. a plurality of sets of roller members each set including a first roller member and a second roller member and being pivotally secured with respect to said housing means;
2. a roller belt extending about each set of said first and second roller members to operably cause simultaneous rotation thereof;
3. a drive belt in abutting contact with each of said first roller members and adapted to cause rotation thereof when driven; and
4. a drive pulley fixedly secured to said drive shaft of said drive means, said drive belt extending about said drive pulley to be driven thereby upon actuation of said drive means resulting in simultaneous driving of said first and second roller members and of each roller belt extending therearound.

14. The apparatus as defined in claim 13 further including a plurality of mounting stems extending downwardly and fixedly secured with respect to said housing members, each of said roller members being rotatably mounted upon one of said mounting stems.

15. The apparatus as defined in claim 13 wherein each of said roller members defines a drive groove therein extending horizontally therearound and being adapted to receive said drive belt therein to facilitate driving thereof.

16. The apparatus as defined in claim 13 further comprising at least one tension pulley means rotatably secured to said housing means and positioned in engagement with said drive belt on the opposite side from said first roller members to facilitate contact between said drive belt and said first roller members.

* * * * *